M. W. OBERMILLER.
MASTER CLOCK.
APPLICATION FILED AUG. 24, 1909.

955,538.

Patented Apr. 19, 1910.

3 SHEETS—SHEET 1.

Witnesses
Jesse N. Lutton.
R. V. Sommers.

Inventor
Max W. Obermiller
By Henry Orth
Attorney

M. W. OBERMILLER.
MASTER CLOCK.
APPLICATION FILED AUG. 24, 1909.

955,538.

Patented Apr. 19, 1910.

3 SHEETS—SHEET 2.

Witnesses
Jesse N. Lutton
B. Sommers

Inventor
Max W. Obermiller
By Henry Orth Jr.
Attorney

M. W. OBERMILLER.
MASTER CLOCK.
APPLICATION FILED AUG. 24, 1909.
955,538.
Patented Apr. 19, 1910.
3 SHEETS—SHEET 3.
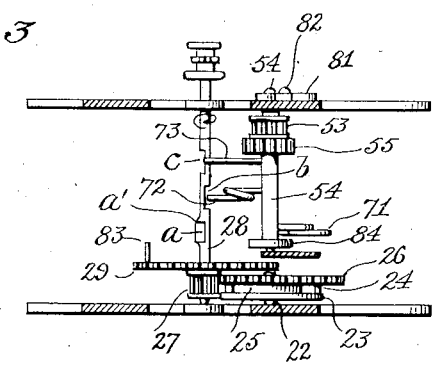
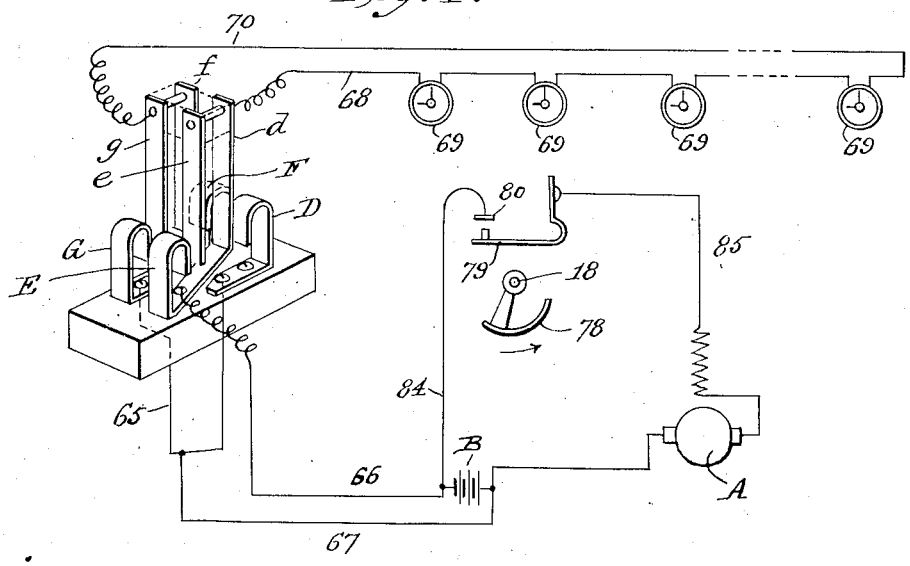
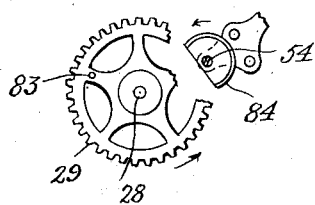
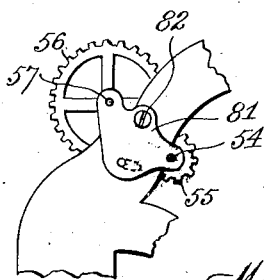
Witnesses
Inventor
Max. W. Obermiller
By Henry Orth Jr.
Attorney

UNITED STATES PATENT OFFICE.

MAX W. OBERMILLER, OF NEW YORK, N. Y.

MASTER-CLOCK.

955,538.  Specification of Letters Patent.  Patented Apr. 19, 1910.

Application filed August 24, 1909.  Serial No. 514,458.

*To all whom it may concern:*

Be it known that I, MAX W. OBERMILLER, a citizen of the United States, residing at New York city, in the county and State of New York, United States of America, have invented certain new and useful Improvements in Master-Clocks; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to master clocks for controlling a number of auxiliary clocks electrically driven therefrom, and has for its object to provide for sending direct current through the auxiliary clock circuit and holding the current in said circuit an appreciable length of time for each period movement of the secondary clock, which period of movement customarily takes place every minute.

The mechanism herein shown and described comprises an assemblage of parts which has greatly simplified the mechanism of master clocks, as will hereinafter be more fully described and claimed.

Figure 1:
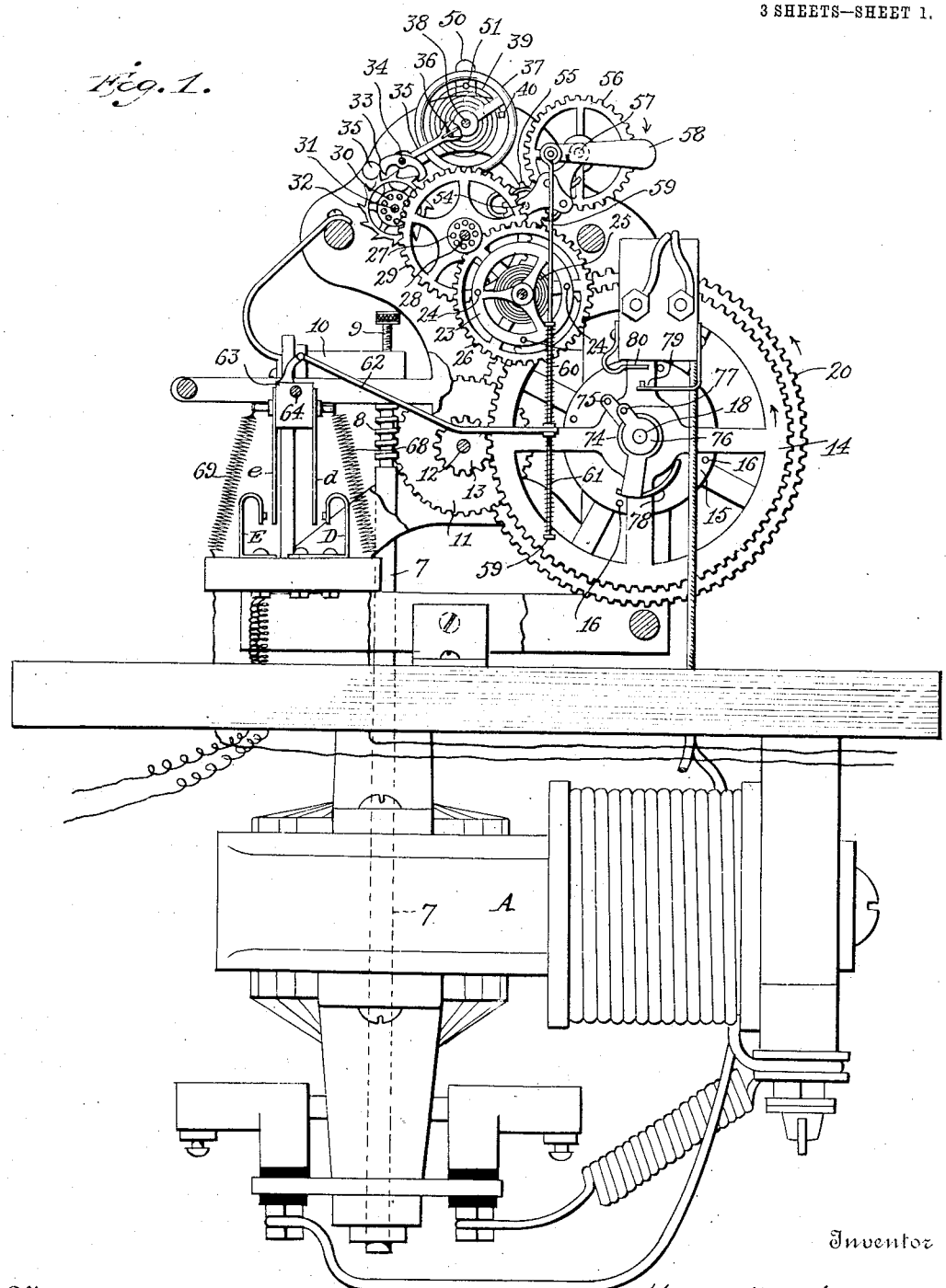
Figure 2:
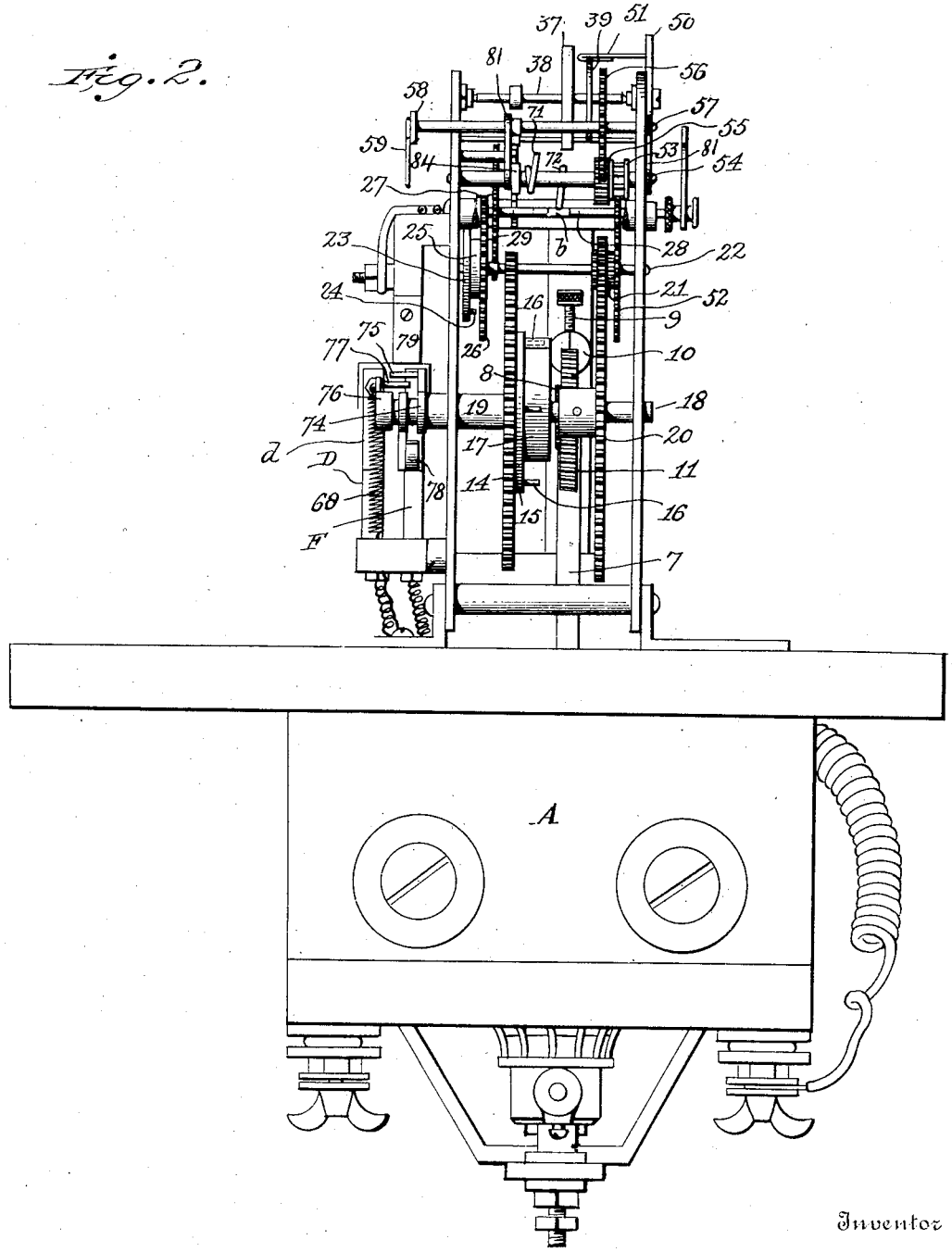

Referring to the drawings which show a full sized, operative, self-winding master clock, and in which like parts are similarly designated—Figure 1 is a side elevation of a clock and its motor. Fig. 2 is an end view thereof. Fig. 3 is a plan view of the minute wheel and arbor. Fig. 4 is a diagram illustrating the electric circuits. Fig. 5 is an elevation of the stop mechanism, and Fig. 6 is an elevation of the releasing adjustment.

The master clock is designed to operate with direct current, preferably, but not necessarily, from two small storage cells, and is of the open circuit type. I have found, from practical experience, that this method of operation in which the circuit is open for comparatively long periods of time and closed for comparatively short periods of time for the operation of secondary clocks, uses less current, and that there is less leakage of current from the wiring due to imperfect insulation and dampness, there being both less voltage and less amperage required for driving the secondary clocks than in closed circuit systems.

The motor used for winding the master clock is a small direct current, series-wound motor A, whose armature shaft 7 is extended and carries at its upper end a worm 8 steadied by a set-screw 9 in a portion, 10, of the clock frame. The worm 8 rotates a worm wheel 11, mounted on an arbor 12, and this arbor carries a pinion 13 that gears with a large spring winding wheel 14. The wheel 14 may or may not have secured thereto a plate 15. This plate 15, or it may be the wheel 14 itself, carries pins 16, to one of which is secured one end of a spiral spring 17, and the others of which limit the unwinding of the spring should the winding mechanism, during repairs or otherwise, be free to unwind to its limit. As the equivalent of the pins 16 and plate 17 I may use the customary spring barrel. The other end of spring 17 is fastened to the arbor 18, on which is also loosely mounted the sleeve 19 that carries the winding wheel 14, consequently the arbor 18 is free to be driven by the spring 17. Rigidly secured to the arbor 18 is a gear wheel 20 that meshes with a pinion 21 on an arbor 22, and this arbor has secured to it a spring barrel or a cage 23 provided with pins 24 serving the same purpose as the pins 15. Secured within the barrel or to one of the pins 24 on the cage plate 23, is a small spiral spring 25, the other end of which is secured to a gear wheel 26 loose on the arbor 22. The gear wheel 26 is the initial wheel, from which the time train is driven, and meshes with the pinion 27 on the minute wheel arbor 28, said arbor also carrying the gear wheel 29 which meshes with a pinion 30 on the escapement shaft 31, which also carries an escapement wheel 32 coöperating with its anchor 33 mounted on an anchor arbor 34. The anchor arbor carries a counter-balanced fork 35, whose forked end engages a pin 36 on a balance wheel 37 that is mounted on a balance wheel arbor 38. A hair spring 39 has one end mounted in a seat 40 and the other end secured to the balance wheel arbor 38. A pivoted arm 50 carries a yoke 51 engaging the hair spring 39 to increase or decrease the effective length of said spring, which is done by moving the arm 50 to the right or left about the axis of the balance wheel as a center. The minute wheel arbor 28 is provided with three notches, *a*, *b* and *c*, and a nose *a'* adjacent notch *a*, the purpose of which will be hereinafter described. The arbor 22 carries a wheel 52 that gears with a pinion 53 on an arbor 54, which also carries a pinion 55 that gears with a wheel 56 on an arbor 57. The arbor 57 carries a counterbalanced crank arm 58 which has pivotally connected to it a rod 59 carrying two coil springs 60 and 61, between the ends of which is held one end of a lever 62 that is connected at its other end to a pivoted insulating head 63, mounted on a pivoted arbor 64, and which head carries four spring contacts d, e, f and g, more clearly shown in Fig. 4. Of these contacts, d and e are electrically connected together, and f and g are electrically connected together, but the pairs of contacts are insulated from one another. These contacts depend between spring contacts D, E, F, G, of which the contacts E and F are electrically connected at their base and form substantially a single piece, while the contacts D, G, are electrically connected by a wire 65. This mechanism, driven by the winding spring 17, constitutes the current reversing mechanism, for reversing the current to the secondary clock line.

Referring now to Fig. 4, B is the storage battery, or other source of direct current electricity. Current is taken from this battery by wire 66 to one pair of contacts E, F, and by wire 67 through 65 to the other pair of contacts D, G. The pair of moving contacts d, e, are connected by wire 68 to the auxiliary clocks 69 arranged in series, and return wire 70 is connected to the other pair of movable contacts f, g.

On the controller shaft 54, Fig. 3, are mounted three stop-pins, 71, 72 and 73; these pins coöperate with the notches a, b and c, respectively, and are capable of resting on the minute wheel arbor 28. The arbor 54 is continuously urged to rotate by reason of wheel 20, pinion 21, gear wheel 52 and pinion 53, but is restrained from rotation by reason of the pins 71, 72, 73, resting at one time or another on the minute wheel arbor 28. In the position shown in Fig. 3, the pin 73 rests on the minute wheel arbor 28, while the pin 72 has just passed through its notch b. As soon as the minute wheel passes through a little over half a revolution, the arbor 54 is rapidly rotated, so as to cause the pin 71 to rest on the nose a' of the minute wheel arbor, whereupon the further rotation of the minute wheel arbor for a small fraction of a revolution will permit the spring pin 71 to be immediately released and pass through its slot a, and permit pin 72 to rest on the minute wheel arbor 28, whereupon, after about three-fourths of a revolution more of the minute arbor, pin 72 is released, and the pin 73 rests on the minute wheel arbor for a little over one-half revolution; when the arbor 54 will again be released and turn through the large angle. This mechanism controls the operation of the current reversing switch shown in Fig. 4, which is accomplished as follows:—When pin 73 passes through its notch c to permit the arbor 54 to rotate the spring 71 through half a revolution, the pinion 55 rotates wheel 56 a quarter turn, thereby causing the counterweighted crank arm 58 to come into either its upper or lower vertical position. It is held there for one second, more or less, until the pin 71 is released from nose a' and passes through its notch a. When the crank arm 58 is held in its upper or lower vertical position, the movable contacts d, e, f and g have been shifted to the left or to the right to come into engagement with their opposed stationary contacts D, E, F, G, consequently the movable contacts are held in engagement with their stationary contacts one second, more or less, until pin 71 has been released by its nose a' through notch a, consequently the current from battery B remains on the line a second, more or less, when the circuit is again broken. After the lapse of one second, more or less, pin 72 comes into engagement with the minute wheel arbor, thereby turning the crank arm 58 through a quarter turn to its horizontal position, either to right or to left, where the crank arm remains until pin 72 is released by its notch b. The shaft 54, then turns to a sufficient distance to allow this pin to pass through notch b. The angle of movement is very small between release of 72 and the engagement of 73, consequently the crank arm 58 will remain practically horizontal during this movement. In this position of the crank arm the movable contacts are in their central neutral position and out of contact with the stationary contacts D, E, F and G.

In order to automatically wind the winding spring 17, I have provided on the sleeve 19 a crank 74, Fig. 2, having a crank pin 75, and mounted on the arbor 18 is a similar crank 76 having a pin 77 capable of passing the pin 75. Between the two cranks, 74 and 76, I mount a cam 78, loose on the arbor 18, which cam is of increasing pitch from its forward to its rear end. This cam at times is capable of being moved by both pins 77 and 75. The cam 78 is sufficiently loose to normally hang by gravity in the position shown in Fig. 1. As the winding spring 17 unwinds it rotates wheel 20 with its arbor 18. The arbor carries with it the crank pin 76 and pin 77, which latter during its rotation picks up the cam 78, and moves it under a spring contact 79, and in so doing forces this contact up against a second contact 80 thereby closing the motor circuit. The motor then starts to revolve and winds up spring 17, as already described. The winding of the spring causes the rotation of the wheel 14 and its sleeve 19, carrying with it the crank 74 and pin 75, until pin 75 overtakes the pin 77 and engages cam 78 and moves it from under the spring contact 79, thereby opening the motor circuit. The winding of spring 17 takes place about once every hour, more or less, and the winding operation continues until wheel 14 has made a little over one revolution.

In order to adjust the time for which the current may be held on the secondary clock line 68—70, I have mounted one end of the arbors 57 and 54 in a bracket 81, which is adjustable to and from the minute wheel arbor a very small fraction of an inch, being held in position by a screw 82. This slight adjustment toward the minute wheel arbor will increase the time between the release of pins 71 and 72, thereby increasing the time during which the movable contacts are held against their corresponding stationary contacts, and by moving the bracket 81 away from the minute wheel arbor 28, the time during which the circuit to the auxiliary clocks remains closed is shortened.

It is, of course, obvious that instead of moving only one end of arbors 54 and 57, both arbors may be mounted in a pair of brackets forming an auxiliary frame capable of being moved to and from the minute wheel arbor. The extent of movement amounts to but a few hundredths of an inch, and the variation of time during which the auxiliary clock circuit is closed need not vary more than from one half second to two seconds.

Should the motor not operate at the proper time, due to the discharge of the batteries, and fail to wind up the winding spring 17, then the clock spring 25 will continue to drive the time train for a short period of time until a pin 83 on wheel 29 comes into engagement with the inner face of a substantially semi-circular cup 84 on arbor 54. The pin 83 travels within the cup for about a period of one second, more or less, or during the time that the current is held on the auxiliary clock circuit, said cup 84 rotating with the arbor 54 first over the pin from the position shown in Fig. 5, and then continues into its initial position, consequently should the cup 84 not be rotated by reason of the winding spring 17 not being wound up, the pin 83 will be stopped within the cup, by reason of said pin striking against its inner wall, thereby causing the minute wheel to stop and preventing the complete unwinding of clock spring 35.

The operation of the device is as follows:—The cam 78 being carried along by pin 76, closes the contacts 79 and 80 by reason of the unwinding of the winding spring 17. Upon the closing of the contact, current from battery B passes by wire 84, (Fig. 4,) contacts 80 and 79 and wire 85 to the motor A and back to the battery; this winding taking place once every hour, more or less. The winding spring being wound, gear wheel 20 operates the releasing mechanism 21, 52, 53, 54, 71, 72, 73, and at each release pins 71, 72 and 73 permit the rotation of arbor 22 to wind up clock spring 25 to drive a clock train. The releasing mechanism operates the current reversing mechanism 55, 56, 57, 58, 59, 62, 63, 64, *d*, *e*, *f* and *g* to send current impulse once every minute to the auxiliary clock line 68—70, reversing the current through the clock line every other minute.

It will be seen from the mechanism herein shown and described that the time train is practically independent of the switch operating mechanism, thereby consuming an almost negligible amount of energy of the clock spring 25 in the operation of the current reversing mechanism. By reason of this independence between the clock train and the current reversing mechanism the coöperation of the several parts of the current reversing mechanism need not be accurately adjusted, and by reason of the fact that the clock spring is wound every minute the same extent that it is unwound, the time train is caused to keep remarkably accurate time.

The motor forms no part of the present invention, the same having been for some time past for sale upon the open market.

I claim—

1. In combination with a time train including a clock spring for driving the same; a reversing switch, mechanism controlled by the time train for actuating the reversing switch, winding mechanism including a winding spring for driving the reversing mechanism and means between the reversing mechanism and the time train to wind the clock spring at each current reversal the same amount as it is unwound in driving the clock train between current reversals.

2. In combination with a time train including a clock spring for driving the same; a reversing switch, mechanism controlled by the time train for actuating the reversing switch, winding mechanism including a winding spring for driving the reversing mechanism, means between the reversing mechanism and time train to wind the clock spring at each current reversal and means between the winding mechanism and the reversing mechanism to control the automatic winding of the winding mechanism.

3. The combination with a time train including a spring for driving the same; of a reversing switch, mechanism controlled by the time train for causing the closure of the switch, holding it closed a predetermined time and then opening said switch, winding mechanism including a winding spring for driving the switch actuating mechanism, and means between the reversing mechanism and time train to wind the clock spring.

4. The combination with a time train including a spring for driving the same; of an electric current reversing switch, mechanism controlled from the time train to operate the switch, winding mechanism including a winding spring for driving the switch actuating mechanism, means for winding the time train spring from the switch operating mechanism at each operation of the switch, an electric motor and an electric circuit for the motor normally open, and means to automatically close said circuit at given intervals to automatically wind the winding mechanism.

5. In an electric master clock, the combination with a source of direct electric current; of a normally open electric circuit, a motor therein, mechanism to close the motor circuit, an auxiliary circuit normally open, mechanism to automatically close the auxiliary circuit, hold it closed for a predetermined time, then open the circuit, and then reverse the current through the auxiliary circuit in the same order.

6. In an electric master clock; a time train including a spring for driving the same, and a minute wheel arbor having three notches therein, a current reversing switch and mechanism to actuate the switch, comprising an arbor having three pins coöperating with said minute wheel arbor and notches, a spring-urged train to actuate the arbor when released by the minute wheel arbor, an arbor having a crank arm thereon periodically driven from the arbor having the pins thereon, a rod pivotally connected to the crank arm and a lever between the switch and rod.

7. In an electric master clock, the combination with a normally open direct current circuit, a winding spring capable of being wound when the motor is actuated, a train driven by said spring, a cam capable of closing the motor circuit, means actuated by an element of the train to move the cam to close the circuit, and means operated during the winding of the spring to move the cam to open the circuit.

8. In an electric master clock, the combination with a time train including a spring and a minute wheel arbor having three notches; of a reversing switch and mechanism for actuating the same comprising a train capable of winding said spring and including an arbor having three pins coöperating with the minute wheel arbor and its notches, and means to adjust the pin arbor to and from the minute wheel arbor to adjust the time of release of said pins.

9. In an electric clock system, the combination with a master clock having an operating circuit and a secondary clock having an operating circuit in parallel with said circuit; of means controlled by the master clock to close said circuits at different time intervals.

10. In an electric clock system, the combination with a master clock having an operating circuit and a secondary clock having an operating circuit in parallel with said circuit; of means to close the second circuit at short time intervals and means dependent upon the operation of the aforesaid means to close the first circuit.

11. In an electric clock system, the combination with a master clock having a time train and an operating circuit, and a secondary clock having an operating circuit; of means controlled by the time train to close the second circuit and means dependent upon the first named means to close the first circuit at a different time interval.

12. In an electric clock system, the combination with a master clock having an operating circuit, and a secondary clock having an operating circuit; of means controlled by the master clock to close said circuits at different time intervals and also hold the circuits closed for different periods of time.

13. In an electric clock system, the combination with a master clock having an operating circuit supplied with continuous current, and a secondary clock having an operating circuit also supplied with continuous current; of means to close the second circuit at short time intervals and reverse the polarity at each time interval, and mechanism dependent upon the operation of said means to close the first circuit.

14. In an electric clock system, the combination with a master clock having a time train and an operating circuit, and a secondary clock having an operating circuit; of a winding train for the time train, means controlled by the time train to close the second circuit and simultaneously wind the clock train and means to close the first circuit and operated from the winding train.

In testimony that I claim the foregoing as my invention, I have signed my name in presence of two subscribing witnesses.

MAX W. OBERMILLER.

Witnesses:
H. G. VANDERHOEF,
W. L. BAKER.